United States Patent [19]

Suzuki et al.

[11] 4,162,529

[45] Jul. 24, 1979

[54] INTERRUPTION CONTROL SYSTEM IN A MULTIPROCESSING SYSTEM

[75] Inventors: Seigo Suzuki, Yokohama; Seiji Eguchi, Kawasaki, both of Japan

[73] Assignee: Tokyo Shibaura Electric Co., Ltd., Japan

[21] Appl. No.: 867,306

[22] Filed: Jan. 5, 1978

Related U.S. Application Data

[63] Continuation-in-part of Ser. No. 747,191, Dec. 3, 1976, abandoned.

[30] Foreign Application Priority Data

Dec. 4, 1975 [JP] Japan ................................ 50/144629

[51] Int. Cl.² ......................... G06F 9/18; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,108,257 | 10/1963 | Buchholz | 364/200 |
| 3,365,704 | 1/1968 | Ulrich | 364/200 |
| 3,398,405 | 8/1968 | Carlson et al. | 364/200 |
| 3,405,394 | 10/1968 | Dirac | 364/200 |
| 3,465,297 | 9/1969 | Thomas et al. | 364/200 |
| 3,469,239 | 9/1969 | Richmond et al. | 364/200 |
| 3,473,159 | 10/1969 | Cantrell et al. | 364/200 |
| 3,528,061 | 9/1970 | Zurcher, Jr. | 364/200 |
| 3,573,736 | 4/1971 | Schlaeppi | 364/200 |
| 3,576,544 | 4/1971 | Cordero, Jr. et al. | 364/200 |
| 3,631,405 | 12/1971 | Hoff et al. | 364/200 |
| 3,706,077 | 12/1972 | Mori et al. | 364/200 |
| 3,725,872 | 4/1973 | Balogh, Jr. et al. | 364/200 |
| 3,761,883 | 9/1973 | Alvarez et al. | 364/200 |
| 3,825,903 | 7/1974 | Brown | 364/200 |
| 3,886,525 | 5/1975 | Brown et al. | 364/200 |
| 3,997,875 | 12/1976 | Broeren | 364/200 |
| 4,037,214 | 7/1977 | Birney et al. | 364/200 |
| 4,065,809 | 12/1977 | Matsumoto | 364/200 |

OTHER PUBLICATIONS

D. L. Dosch et al., "Multiple Device–Processor Interface" in IBM Technical Disclosure Bulletin, vol. 16, No. 3, Aug. 1973, pp. 887–888.

*Primary Examiner*—Melvin B. Chapnick
*Attorney, Agent, or Firm*—Finnegan, Henderson, Farabow & Garrett

[57] ABSTRACT

An entry requirement control system in a multiprocessing system having a plurality of central processing units (CPU's), a common main memory for storing a plurality of programs which are accessed by the CPU's, and a key register provided between the CPU's and the common main memory. A flag bit circuit is incorporated into the system in the form of hardware in the key register and is adapted, upon completion of the execution of a program by one CPU, to only give priority to the earliest entry requirement made by a plurality of CPU's to the same program and prohibit the other CPU's from being given any priority. A flag bit circuit corresponding to each program acts, while one program is executed by one CPU, to prohibit an entry requirement from the other CPU's.

2 Claims, 7 Drawing Figures

F I G. 1
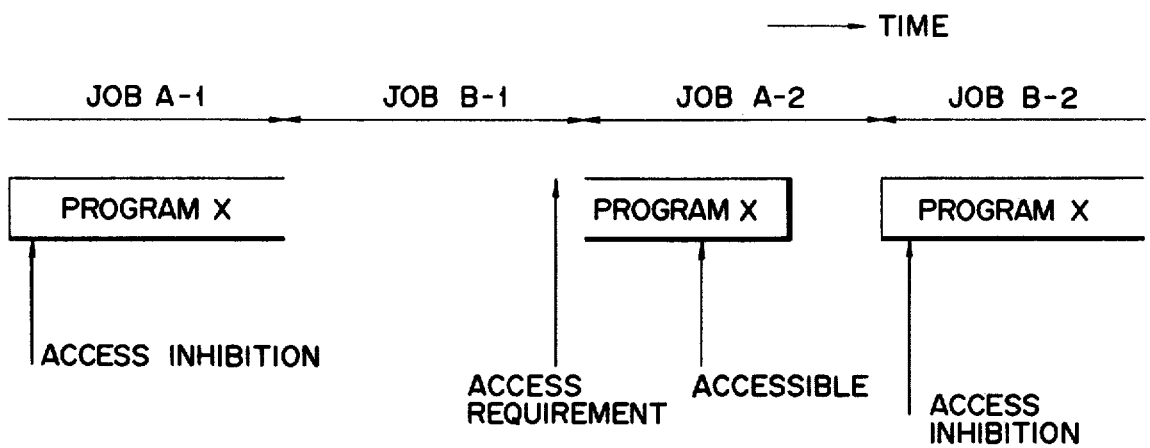
F I G. 2
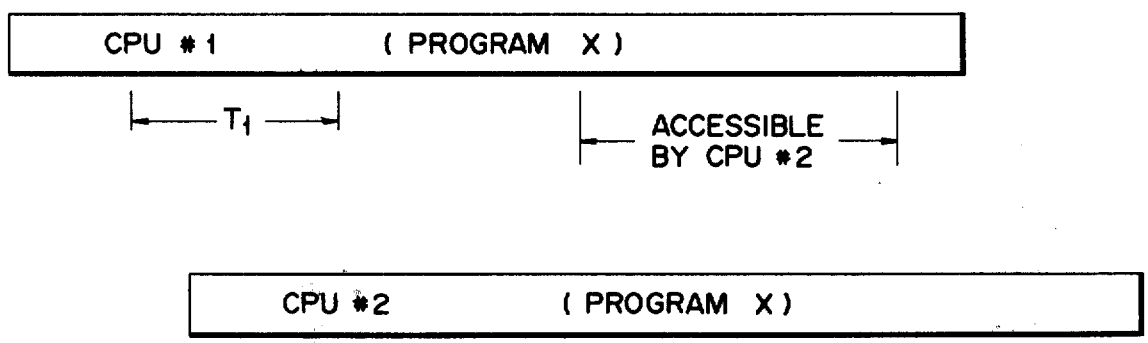
F I G. 3A
F I G. 3B
F I G. 3C
F I G. 3D

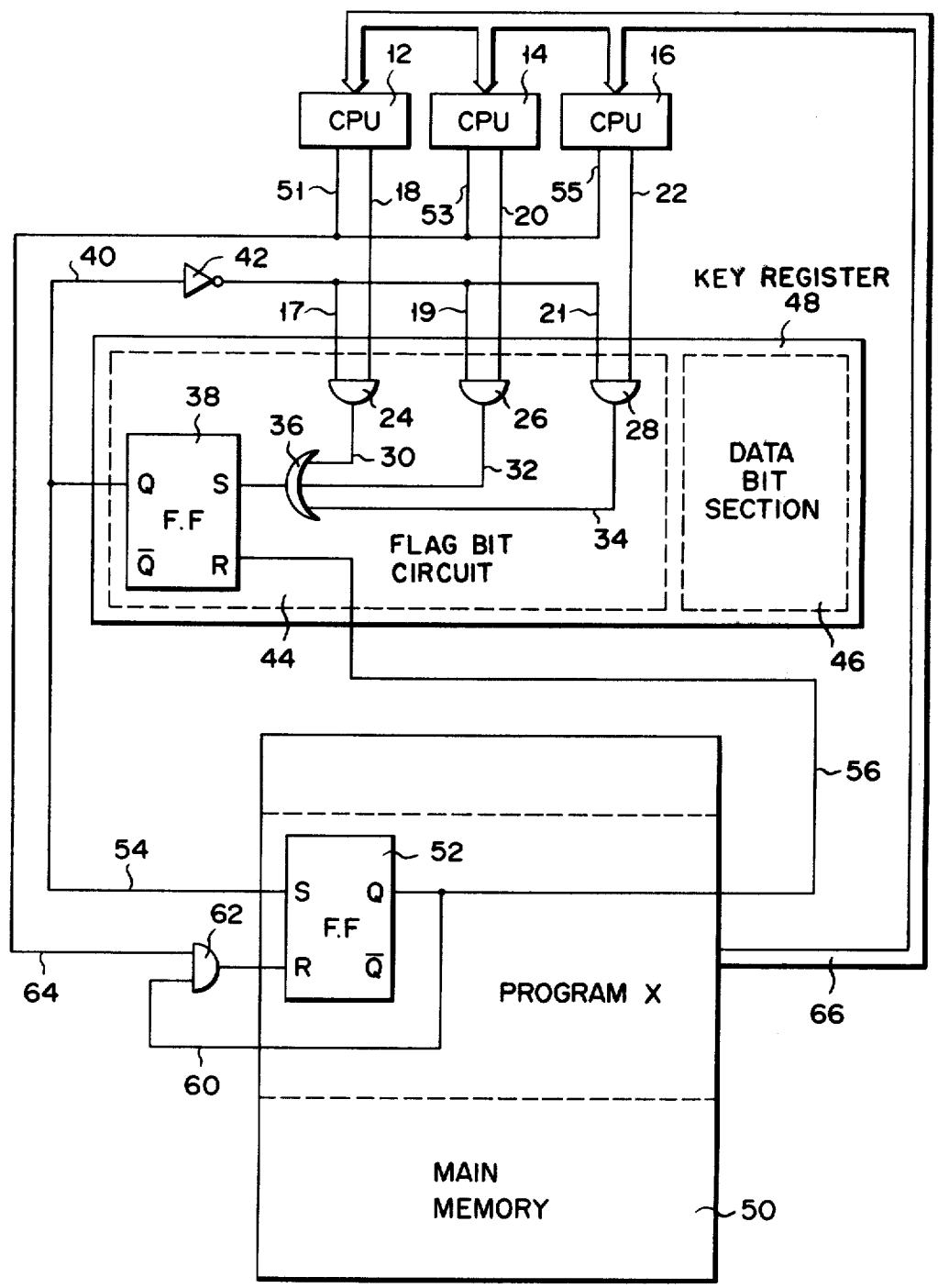
F I G. 4

INTERRUPTION CONTROL SYSTEM IN A MULTIPROCESSING SYSTEM

PARENT APPLICATION

This is a continuation-in-part of U.S. application Ser. No. 747,191, entitled "Program Controlling System In A Data Processing System," filed Dec. 3, 1976, now abandoned.

BACKGROUND OF THE INVENTION

This invention relates to a program controlling system in a data processing system using a multiprocessing or multiprogramming system.

In a data processing system a very great difference in operation speed is involved between a central processing unit (CPU) and a peripheral unit. That is, the operation speed of a CPU is very rapid as compared with that of a peripheral unit, a great amount of idle time results in the CPU and it is impossible to achieve an effective utilization of the CPU. As a result, the throughput of the data processing system is lowered.

To improve the throughput of the data processing system the idle time in the CPU is utilized to execute another job. To this end use is made of a system for effectively utilizing the CPU, such as a data processing system of the multiprocessing or multiprogramming type. With a multiprocessing or multiprogramming system the control of programs becomes very complicated. To protect data being processed, it is necessary to inhibit a reentrant program being accessed at the present point in time by a given instruction from being accessed by another instruction, that is, inhibit data access by another instruction to that specified portion of a data storing area of a common main memory where a reentrant program is stored.

This will be explained more in detail by way of example by referring to FIG. 1.

With a conventional multiprogramming system for processing jobs A and B by using a CPU in a time sharing basis, data destruction is prevented by using a separate stack for each job or by storing data in a specified area of a common memory. In the former case, however, data on the stack-free portion storing of the data area of a common memory is not protected and in the latter case, on the other hand, much time loss is involved in the interruption of a program.

As shown in FIG. 2, with a multiprocessing system for executing jobs concurrently by means of two CPU's (i.e., CPU 1 and CPU 2) there is a possibility that an access request will be substantially concurrently directed by both CPU's to the same reentrant program X. If CPU 1 is now executing a reentrant program X on a job A, it is necessary to inhibit the reentrant program X from being loaded onto CPU 2. In this case it is necessary that such an inhibit state be indicated in a common memory. The normal practice is to set an access inhibit key. In this case, however, a certain time $T_1$ will be required to set such an excess inhibit key. During this time, data transfer is effected several times between CPU 1 and the common memory. If during the time $T_1$ access to the reentrant program X is requested by CPU 2 there is the fear that data will be destroyed.

SUMMARY OF THE INVENTION

It is accordingly the object of this invention to provide a program controlling system in a data processing system such as a multiprocessing or multiprogramming system, in which during access by a given instruction to a reentrant program it is possible to inhibit the reentrant program from being accessed by another instruction and in consequence protect data being processed.

According to this invention, a program controlling system in a data processing system such as a multiprocessing or multiprogramming system is provided in which there is provided, in a memory having a data storing area accessible by a plurality of instructions, a key for showing a state for inhibiting data access to the data storing area of the common memory.

BRIEF DESCRIPTION OF THE DRAWING

FIG. 1 is a view showing a data processing system based on a multiprogramming system;

FIG. 2 is a view showing a data processing system based on a multiprocessing system;

FIGS. 3A to 3D show a time chart on the basis of which a key bit in a program controlling system is set; and FIG. 4 is a general block diagram illustrating one embodiment of the entry requirement control system of the invention.

DETAILED DESCRIPTION OF THE PREFERRED EMBODIMENTS

In a program controlling system according to this invention there is provided, in a memory having a data storing area accessible by a plurality of instructions, a key for showing a state for inhibiting the data storing area now being accessed by a given instruction from being accessed by another instruction.

FIGS. 3A to 3D show a time chart showing procedures of the key. FIG. 3A is a waveform showing the occupation state of a common memory, FIG. 3B is the waveform of a signal for taking a timing of an instruction fetch, FIG. 3C is a waveform of a signal for sensing the key and FIG. 3D is the waveform of a signal for setting the key. As will be apparent from FIGS. 3A to 3D, the key is set to "1" in synchronism with the time at which a processor fetches an instruction from a common memory. FIG. 4 shows a circuit for setting a key to "1" and is detailed operation will be explained later in conjunction with FIG. 4.

If, in a data processing system of the multiprogramming type, there exists any key bit showing a state for inhibiting data access to a data storing area, even when one job to be done is switched to another job and a reentrant program is accessed by an instruction on another job, such an access is inhibited and, in consequence, the above-mentioned another job is delayed until such an access is allowed. As a result, data protection is assured.

In a multiprocessing system, on the other hand, an access inhibit state is not immediately set by a reentrant program access inhibit operation by a processor to the data storing area of a common memory. To ensure data protection, for example, a state for occupying a data transfer bus must be set, for example, by a memory control device. That is, it is necessary to occupy the processing system from the start of access by a given processor to a reentrant program until the execution of the instruction is completed and inhibit a reentrant program access request by another processor. To this end, a key register constructed of a key bit configuration is connected directly to a data transfer bus and a state showing that the data transfer bus is occupied is stored in the key register. By so doing, a reentrant program access request by another processor is inhibited by sensing the key register.

FIG. 4 shows one embodiment of the invention in which an entry requirement control system is applied to a multiprocessing or multiprogramming system.

First ports of three CPU's 12, 14 and 16 are connected respectively through lines 18, 20, and 22 to the input terminals of conventional AND circuits 24, 26 and 28. The output terminals of the AND circuits 24, 26 and 28 are connected respectively through lines 30, 32 and 34 to the input terminal of a conventional OR circuit 36. the output terminal of the OR circuit 36 is connected to the set terminal S of a conventional R-S flip-flop circuit 38. The Q terminal of the flip-flop circuit 38 is connected through an inverter 42 by way of a line 40 to the other input terminals 17, 19 and 21 respectively of the AND circuits 24, 26 and 28. The flip-flop circuit 38 acts as a flag bit and a flag bit circuit 44 is constituted of the flip-flop circuit 38, AND circuits 24, 26 and 28, OR circuit 36 and their interconnection.

A key register 48 includes the flag bit circuit 44 and a DATA bit section 46. A number of programs are stored in a common main memory 50. For convenience, only one program will be explained below. A program X includes OPERAND bits, DATA bits (both not shown) and a flag bit. The display of the flag bit is effected by a conventional S-R flip-flop circuit 52. The S terminal of the flip-flop circuit 52 is connected by way of a line 54 with the Q terminal of the flip-flop circuit 38. The Q terminal of the flip-flop circuit 52 is connected by way of a line 56 to the R terminal of the flip-flop circuit 38. The Q terminal of the flip-flop circuit 52 is also connected by way of a line 60 to one input terminal of an AND circuit 62. The other input terminal of the AND circuit 62 is connected through a line 64 to the second ports 51, 53 and 55, respectively, of the CPU's 12, 14 and 16. The program X is connected through a bus line 66 to third ports of the CPU's 12, 14 and 16. The memory 50 includes a plurality of programs, through only one, program X, is illustrated in FIG. 4. Although only one flag bit circuit 44 of the key register 48 is shown in FIG. 4, flag bit circuits 44 corresponding to the number of programs are provided in practice.

The flip-flop circuit 52 of the memory 50 acts as a flag bit circuit when the program X is accessed by one of the CPU's 12, 14 and 16, i.e., when program X is being executed by one CPU, and thus inhibits entry by the other CPU's to the program X. Where against the program X being now executed by one CPU a next entry requirement from another CPU is stored, the flag bit circuit of the key register 48 indicates that a succeeding entry requirement from yet another CPU is inhibited from being stored. In such entry requirement control system, data transfer between the CPU's 12, 14 and 16 and the main memory 50 is effected through the key register 48.

Explanation will now be made of the logical operation of the FIG. 4 system.

Suppose that the program X is not accessed by any of the CPU's 12, 14 and 16. In this case, the flip-flop circuit 38 is set in, or reset, to the initial state. Likewise, the flip-flop circuit 52 is also set in, or reset, to the initial state. When in this state an entry requirement is made by the CPU 12 to the program X, for example, then it is inputted by way of the line 18 to the AND circuit 24. Since the flip-flop circuit 38 is reset, a signal on the Q terminal is at the "0" level. The "0" level signal is supplied to the inverter 42 on the line 40 where it is inverted to a "1" level signal. The "1" level signal is supplied to the AND circuit 24 to cause the latter to be opened. Thus, the entry requirement from CPU 12 is passed through the AND circuit 24 and OR circuit 36 and is supplied to the S terminal of the flip-flop circuit 38 to cause the latter to be set.

As a result, a "1" level signal appears from the Q terminal of the flip-flop circuit 38. The "1" level signal is fed by way of the line 54 to the S terminal of the flip-flop circuit 52 to cause the latter to be set. By so doing, the CPU 12 gains access to the exemplary program X. Thus, the program is read onto the CPU 12 through the bus line 66 and executed. When the flip-flop circuit 52 is set, the "1" level signal is delivered from its Q terminal. The "1" level signal is supplied to the R terminal of the flip-flop circuit 38 to cause the latter to be reset. The "1" level signal is also supplied from the Q terminal to the AND circuit 62. When the execution of the program X by the CPU 12 is completed, the CPU 12 supplies an END signal to the AND circuit 62 through line 64. Flip-flop circuit 52 is at that point reset.

Suppose now that, during the execution of the program X by the CPU 12, the CPU 14 delivers an entry requirement to the program X. Then, the entry requirement is supplied to one input terminal of the AND circuit 26 by way of the line 20. At this time, a "1" level signal is being supplied to the other input terminal of the AND circuit 26. This is because at this time the flip-flop circuit 38 is in the reset state, the Q terminal of the flip-flop circuit is at the "0" level and the "0" level signal is applied through the inverter 42 to the other input terminal of the AND circuit 26 as a "1" level signal. In consequence, the entry requirement from the CPU 14 is supplied through the AND circuit 26 and OR circuit 36 to the S terminal of the flip-flop circuit 38 to cause the latter to be set.

An output signal indicative of the entry requirement from CPU 14 is generated from the Q terminal of the flip-flop circuit 38 and delivered through line 54 to the S terminal of the flip-flop circuit 52. Thus, the state of the flip-flop circuit 52 is sensed. Since at this time the flip-flop circuit 52 is set, the output signal acknowledges that the program X cannot be accessed or occupied by the other CPU. That is, the state that an entry by the CPU 14 to the program X is inhibited is known, and the flip-flop circuit 52 serves as a flag bit for inhibiting access by the CPU 14 to the program X.

When the execution of the program is completed, the CPU 12 delivers an END signal. The END signal is applied to one input terminal of the AND circuit 62 by way of the line 64. While the flip-flop circuit 52 is set, a "1" level signal is being supplied to the other input terminal of the AND circuit 62. In consequence, the END signal is passed through AND circuit 62 and the flip-flop circuit 52 is reset. That is, the "inhibit state" is released and replaced by an "accessible state". The flip-flop circuit 52, when in such a state, is set by an output signal from the flip-flop circuit 38 corresponding to an entry requirement from the CPU 14. That is, the CPU 14 gains access to the program X. In this way, simultaneous access by different CPU's to the same program is prevented.

Let is be assumed that during the access by the CPU 12 to the program X the CPU 14 makes an entry requirement to the program X and immediately thereafter the CPU 16 makes an entry requirement to the program X. In this case, the entry requirement from the CPU 14 is supplied to the AND circuit 26 by way of a line 20 and then the entry requirement from the CPU 16 is supplied to the AND circuit 28 by way of the line 22. The entry requirement from the CPU 14 is supplied through the AND circuit 26 and OR circuit 36 to the S terminal of the flip-flop circuit 38 to cause the latter to be set as just described. Thereafter, the entry requirement from the CPU 16 is supplied through the AND circuit 28 and OR circuit 36 to the S terminal of the flip-flop circuit 38.

When the entry requirement from the CPU 16 reaches the S terminal of the flip-flop circuit 38, the flip-flop circuit 38 is already set by the entry requirement from the CPU 14. That is, since the entry requirement from the CPU 14 has been already stored, the entry requirement from the CPU 16 is inhibited. In other words, the flip-flop circuit 38 functions as a flag bit for inhibiting a grant of priority to the entry requirement made by the CPU 16 to the program X. The CPU 16 recognizes the presence of the entry requirement made by the other CPU to the same program X, that is, that the other CPU is in the "wait" state. Since the entry requirement from the CPU 16 is given no priority, even if the execution of the program X by the CPU 12 is completed, the entry requirement made by the CPU 16 to the same program cannot be realized.

When the execution of the program X by the CPU 12 is completed, the flip-flop circuit 52 is reset and the program X is in the "accessible" state. In this state, the entry requirement which is in the "wait" state, i.e., the entry requirement from CPU 14, is permitted to access the program X for execution. When the CPU 14 effects an entry into the program X the flip-flop circuit 38 is reset by a signal from the Q terminal of the flip-flop circuit 52 through line 56. As a result, the flip-flop circuit 38 indicates that it can grant a priority to an entry requirement made by CPU 16 to the program X. Under this condition the entry requirement from CPU 16 is accepted at the flip-flop circuit 38 to cause the latter to be set. When set, the flip-flop circuit 38 prohibits acceptance of another entry requirement and, when the CPU 14 completes the execution of the program X, the preferential access by the CPU 16 to the program is secured.

As will be evident from the above, the entry requirement control system of this invention has advantageous features.

Specifically, since the flag bit circuit can inhibit the grant of priority to entry requirements made by CPU's to the same program, even if entry requirements are made by different CPU's to the same program in close succession, priority is given to only the earliest one of the entry requirements and no succeeding entry requirement from the other CPU's is granted access to the same program, thus preventing entry requirements from being simultaneously made to the same program. A flag bit circuit for indicating an entry inhibit state is provided in the form of hardware associated with each program. When, therefore, the execution of the program is completed, a state accessible by the next entry requirement is indicated to permit the next entry requirement to be made to the program now under consideration. This enhances processing efficiency.

What we claim is:

1. An entry requirement control system for a data processing system comprising:

a plurality of central processing units each including means for generating an entry requirement to read a program, means for executing the program and means for generating an END signal when execution of the program is completed;

a common main memory connected to each of said processing units and including a program to be accessed by the processing units;

a key register connected between said central processing units and said memory, said key register including a first flag bit circuit having a first set terminal, a first reset terminal, a first output terminal and a first flag bit wherein, upon receipt of an entry requirement from one of the processing units, said first flag bit circuit is set, a first output signal is generated and access to the program by the remaining processing units is inhibited;

a second flag bit circuit, having a second set terminal, a second reset terminal, a second output terminal and a second flag bit, for receiving said first output signal from said first flag bit circuit to generate a second output signal and allowing access to the program by said one processing unit, wherein said second flag bit circuit is set in response to said first output signal from said first flag bit circuit to inhibit access to said program by said remaining processing units, and wherein said second output signal is applied to said first reset terminal of said first flag bit circuit;

first reset means for conducting said second output signal to said first reset terminal of the first flag bit circuit to reset the first flag bit circuit, said first reset means being provided between said first reset terminal of said first flag bit circuit and said second output terminal of the second flag bit circuit; and second reset means for resetting the second flag bit circuit in response to a condition that said second output signal and said END signal coexist, said second reset means being provided between said central processing units and said second reset terminal of the second flag bit circuit.

2. The entry requirement control system of claim 1 wherein said key register further includes means for granting access to the program by the remaining processing units in accordance with the order of generation of entry requirements for the program by said remaining processing units.

* * * * *